United States Patent Office.

FREDERICK KALTEYER, OF SAN ANTONIO, TEXAS.

Letters Patent No. 93,622, dated August 10, 1869.

IMPROVED COMPOUND FOR DESTROYING VERMIN IN CATTLE.

The Schedule referred to in these Letters Patent and making part of the same.

*To all whom it may concern:*

Be it known that I, FREDERICK KALTEYER, of San Antonio, in the county of Bexar, and State of Texas, have invented a new and improved Liniment for the destruction of the so-called screw-worm, the worms (larvæ) from the eggs of the different species of mead-flies, and preventing the flies from depositing their eggs in the wounds of domestic animals, such as horses, cattle, sheep, swine, &c.; and I do hereby declare that the following is a description of the mode of preparing the same.

My invention consists in forming a compound of the ingredients hereinafter named, that will prevent flies from infesting wounds in domestic animals, preventing the development of any eggs that may have been deposited, and at the same time coagulating the albumen in the wound, and causing the wound to matter.

My liniment is composed of the following-named ingredients, in about the proportions specified:

Soap, two parts; glycerine, two parts; corrosive sublimate, one part; cresylic or carbolic acid, six parts; alcohol, six parts; kerosene-oil, six parts; turpentine, six parts.

These ingredients are thoroughly incorporated, forming a compound of a consistence that is easily applied, and that will be retained in the wound a sufficient length of time to accomplish the object desired.

What I claim as my invention, and desire to secure by Letters Patent, is—

A liniment, composed of the ingredients in the proportions substantially as and for the purpose specified.

FREDERICK KALTEYER.

Witnesses:
AUG. HARTMAN,
CHARLES W. BAYEK.